United States Patent
Sloane

[15] 3,650,903

[45] Mar. 21, 1972

[54] METHOD OF PRODUCTION OF FIBRINOLYTIC MATERIAL

[72] Inventor: Nathan H. Sloane, Germantown, Tenn.

[73] Assignee: Rand Laboratories, Inc.

[22] Filed: July 15, 1969

[21] Appl. No.: 841,974

[52] U.S. Cl. ..........................................................195/66 B
[51] Int. Cl. ........................................................C07g 7/026
[58] Field of Search................................................195/66 B

[56] References Cited

UNITED STATES PATENTS 3,468,760  9/1969  Joss ........................................195/66

Primary Examiner—Lionel M. Shapiro
Attorney—Pennie, Edmonds, Morton, Taylor and Adams

[57] ABSTRACT

A fibrinolytic material comprising urokinase in highly concentrated form is produced by admixing with human urine an equine adsorbant prepared from an insoluble precipitate which forms in pregnant mare's urine. This insoluble residue extracts and adsorbs urokinase from human urine thereby permitting its recovery, in concentrated form, in a single step. The urokinase is then eluted from the adsorbant, collected, and purified for use in humans or animals to dissolve blood clots and/or prevent their formation, and for use as a blood thinning agent.

3 Claims, No Drawings

METHOD OF PRODUCTION OF FIBRINOLYTIC MATERIAL

BACKGROUND OF THE INVENTION

1. Field of the Invention

This invention relates to a method for the production of a fibrinolytic material, comprising urokinase in highly concentrated form, for use in humans to dissolve blood clots and/or prevent their formation, and for use as a blood thinning agent. It has been found that when pregnant mare's urine is allowed to stand, an insoluble precipitate forms and settles therein which, after suitable treatment, has the ability of being able to extract and absorb urokinase from urine, thereby allowing its collection and recovery in concentrated form in a single step. The urokinase obtained as a result of the separation and collection procedures described herein has been found to be very effective as a treatment for blood disorders which involve clotting and thickening of the blood.

2. Description of the Prior Art

Urokinase is an enzyme cofactor which stimulates the production in the blood of the clot-dissolving proteolytic enzyme, plasmin. It is this property which makes it extremely important for use in the treatment of persons having various circulatory disorders which tend to cause the formation of blood clots.

Human urine is an excellent source of urokinase particularly in view of its non-antigenicity and the almost unlimited supply which could be made available. Therefore, a method which utilizes urine as a source of urokinase is desirable both from an economic and a medical standpoint.

Large volumes of urine are needed to produce urokinase in sufficient amounts for medical purposes, however, and therefore, it is desirable to have a method wherein a urokinase-rich fraction of comparatively small unit volume can be isolated quickly and efficiently. Heretofore, urokinase has been obtained from urine by its absorption on benzoic acid. This process, however, requires a great number of cumbersome and inefficient steps for the purification of urokinase.

I have previously disclosed in certain of my presently pending United States patent applications, methods for the concentration and purification of urokinase in which tannic acid has been added to urine as a means of precipitating the urokinase therefrom. These, and related purification procedures, are disclosed in applications Ser. No. 586,968, filed Oct. 17, 1966; now U.S. Pat. No. 3,586,968, Ser. No. 625,019, filed Mar. 22, 1967, now U.S. Pat. No. 3,477,911, and Ser. No. 651,707, filed July 7, 1967, now U.S. Pat. No. 3,477,912. Another separation method is disclosed in my U.S. application Ser. No. 722,212, filed Apr. 18, 1969, now U.S. Pat. No. 3,544,427 which relates to the extraction of urokinase from urine by its absorption on an insoluble blood serum protein precipitate. The foregoing applications are related to each other and to the present application in the sense that they describe various novel methods for the efficient extraction and purification of urokinase in concentrated form from urine. The present application relates to a new method in which the insoluble residue that forms in pregnant mare's urine is utilized for the extraction of urokinase from human urine. This method and source of material is quite useful because of its very high efficiency and because of its specificity with respect to the urokinase.

SUMMARY OF THE INVENTION

The present invention is based on the discovery that urokinase activity, in concentrated form, can be efficiently extracted from human urine in a single step by its adsorption on an insoluble residue which forms and settles in pregnant mare's urine. The urokinase is extracted from the urine in a form which is readily isolated for purification, thus eliminating the need for further cumbersome and inefficient separation steps. This equine adsorbant, the chemical composition of which is presently unknown, is treated to remove the horse proteins and fibrinolytic activity present therein, and is then admixed with human urine from which it extracts and adsorbs urokinase. The urokinase-containing adsorbant is then easily collected and separated by any suitable means such as centrifugation.

The urokinase-containing equine adsorbant is then treated to solubilize the urokinase so that it can be separated from the adsorbant and collected. The urokinase is then purified by dialysis or other suitable means such as is disclosed in my prior copending United States applications. This invention permits the efficient extraction in a single step of a urokinase-rich fraction which is comparatively small in unit volume having a specific activity of from about 3,000 to 10,000 CTA units per milligram of protein.

DESCRIPTION OF THE PREFERRED PRACTICE OF THE INVENTION

Human urine, collected in the presence of a preservative such as chloroform to prevent the growth of harmful bacteria, is used as a source of urokinase herein. This precludes the possibility of an adverse reaction in human recipients of the urokinase which would be caused by a product produced from a non-human protein source. The method of this invention is also applicable for the extraction of urokinase from urine of non-human origin. However, until methods become available which permit the use in humans of non-human sources of urokinase, the use of such urokinase must be restricted for use in animals.

A urokinase-rich fraction is separated from the urine in a single step by admixing with said urine an equine adsorbant prepared from the insoluble precipitate which forms and settles in pregnant mare's urine upon standing. This adsorbant material must first be treated to remove horse fibrinolytic material and other horse proteins before it can be used in the process of this invention. The procedure by which this equine adsorbant is prepared is as follows:

PREPARATION OF EQUINE ADSORBANT

Approximately 50 grams (dry weight) of the horse residue is suspended in about 250 ml. of 0.05M tris (hydroxymethyl) aminomethane buffer solution at a pH of about 7.4 (essentially neutral). 1N HCl is added to the mixture with continuous stirring to adjust the pH to about 5.0 or slightly acid. At this stage of the process, there will be observed some slight foaming. It has been observed that about 150 ml. of the acid and about an hour or more are required to accomplish the first step in the process. Following the foregoing procedure, the precipitate is recovered by centrifugation and the supernatant liquid is discarded which eliminates a considerable amount of precipitatable horse protein. The recovered precipitate is added to about 1 liter of 0.05M tris buffer solution containing about 0.1M versene. The pH of this mixture is adjusted to about 7.4 and allowed to stir overnight at a cold temperature.

After being treated in the foregoing manner, the precipitate is recovered by centrifugation and suspended in approximately 100 ml. of 0.05M tris buffer solution. Approximately 50 ml. of cold n-butanol is added to the suspension which is shaken and then centrifuged to recover the precipitate. The precipitate is then washed with tris buffer solution and suspended in a tris buffer solution (approximately 10 ml.) to which from 1 to 10 ml. of sodium deoxycholate (2–10 mg./ml.) are added per ml. of buffer solution. The mixture is then stirred for approximately one hour. The sodium deoxycholate solubilizes horse fibrinolytic activity which is present in the precipitate together with extraneous horse proteinaceous materials so that they may be separated and removed from the equine adsorbant. The insoluble precipitate is then collected and washed with 0.05M tris buffer solution at a pH of about 7.4 to remove residual sodium deoxycholate. This equine adsorbant is then suspended in tris buffer solution at a concentration of about 50 mg. per ml. for use in the process of the present invention.

EXTRACTION OF UROKINASE FROM HUMAN URINE

To 200 ml. of human urine there is added from about 0.1 to 1.0 ml. of a suspension of equine adsorbant in tris buffer solution. This results in a suspension of from about 5 to 50 mg. of adsorbant based on dry weight per 200 ml. of urine. The mixture is stirred at room temperature for about 30 minutes after which the adsorbant is separated and collected by means of centrifugation and washed with cold 0.05M tris buffer solution at a pH of about 7.4. This single step results in the adsorption of at least 90 percent of the urokinase activity in the urine being adsorbed in the equine adsorbant.

The equine adsorbant is then treated to elute the urokinase activity by suspending it in 2 ml. of tris buffer solution containing from 2 to 10 ml. of sodium deoxycholate per ml. of buffer solution and stirring the solution at about 14° C. for approximately 30 minutes. The sodium deoxycholate solubilizes the urokinase and thereby allows its removal from the adsorbant by centrifugation resulting in a concentrated solution of urokinase activity containing the equivalent of 5,000 CTA units per liter of urine. The specific activity of the eluted urokinase is from 3,000 to 10,000 CTA units per milligram of protein.

I claim:

1. A method for producing urokinase, in a concentrated form, comprising contacting urine with an equine adsorbant, said equine adsorbant being prepared by:
   1. collecting the insoluble precipitate which forms in pregnant mare's urine upon standing;
   2. suspending said precipitate in neutral buffer solution and adjusting the pH thereof to about 5 by the addition thereto of cold acid;
   3. separating and collecting said precipitate and adding the same to a neutral buffer solution in which versene is present at a concentration of about 0.1M, adjusting the pH to about neutral, and stirring said suspension for an extended period while it is maintained at a cold temperature;
   4. collecting said precipitate and suspending it in neutral buffer solution to which is added cold n-butanol, said suspension being shaken and the precipitate later being collected;
   5. washing said precipitate with a neutral buffer solution in which sodium deoxycholate is present in a concentration of from about 1 to 10 mg. per ml. of buffer solution; and
   6. washing said precipitate with neutral buffer solution, collecting said precipitate and suspending it in neutral buffer solution, and contacting said urine with said equine adsorbant to adsorb urokinase therein, collecting the urokinase-containing adsorbant and recovering said urokinase by eluting it from said adsorbant and collecting the same.

2. A method in accordance with claim 1 wherein a suspension of equine adsorbant in neutral buffer solution is admixed with human urine in a ratio of from about 5 to 50 milligrams of adsorbant per 200 ml. of urine.

3. A method in accordance with claim 2 wherein said urokinase-containing adsorbant is separated from said urine by centrifugation, collected, and washed with cold tris buffer at a concentration of about 0.05M and at a pH of about neutral, said urokinase activity being eluted from said adsorbant in a cold tris buffer solution containing from 1 to 5 milligrams of sodium deoxycholate per milliliter of buffer solution, said urokinase-containing eluate being collected.

* * * * *